United States Patent [19]

Martinez

[11] Patent Number: 4,487,404
[45] Date of Patent: Dec. 11, 1984

[54] SERVICE RACK FOR FUEL INJECTORS

[76] Inventor: Eloy J. Martinez, 2450 Medallion Dr., Union City, Calif. 94587

[21] Appl. No.: 394,805

[22] Filed: Jul. 2, 1982

[51] Int. Cl.³ .............................................. B23Q 3/00
[52] U.S. Cl. ...................................... 269/15; 269/43; 269/296
[58] Field of Search ................... 269/15, 296, 43, 40, 269/60, 69, 289 R, 297, 298; 211/77, 78, 81, 163; 248/183, 179, 660

[56] References Cited

U.S. PATENT DOCUMENTS

| | | | |
|---|---|---|---|
| 1,481,503 | 1/1924 | Carswell et al. | 269/60 X |
| 1,503,188 | 7/1924 | Hoyoux | 269/296 X |
| 1,600,835 | 9/1926 | Manley | 269/60 X |
| 1,812,585 | 6/1931 | Collins | 269/60 X |
| 1,834,294 | 12/1931 | Spahn | 269/60 X |
| 2,814,099 | 11/1957 | Knittel | 269/296 X |
| 2,846,761 | 8/1958 | Evans | 269/69 X |

FOREIGN PATENT DOCUMENTS 607803  1/1984  United Kingdom .................. 269/69

Primary Examiner—Frederick R. Schmidt
Assistant Examiner—Steven P. Schad
Attorney, Agent, or Firm—Bielen and Peterson

[57] ABSTRACT

A service rack for fuel injectors allowing a plurality of injectors to be simultaneously mounted for inspection, disassembly, repair and reassembly, the rack having a support assembly for mounting of a variable plurality of fuel injectors pairs, a clamping mechanism for retaining the injectors for maintenance inspection and repair, a locking pivot support allowing the support assembly to be inverted for access to the bottom as well as the top of the injectors and a swivel column allowing the support assembly and pivot support to be rotated for access to a front and back row of injectors, the swivel column being connected to a service table with a raised rim for collection of spilled fuel and dropped parts.

7 Claims, 6 Drawing Figures

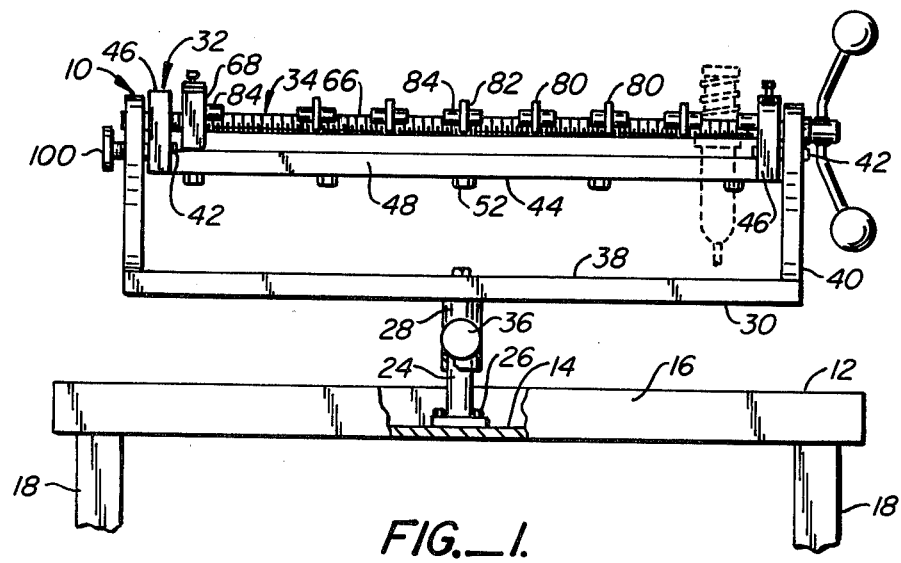
FIG._1.
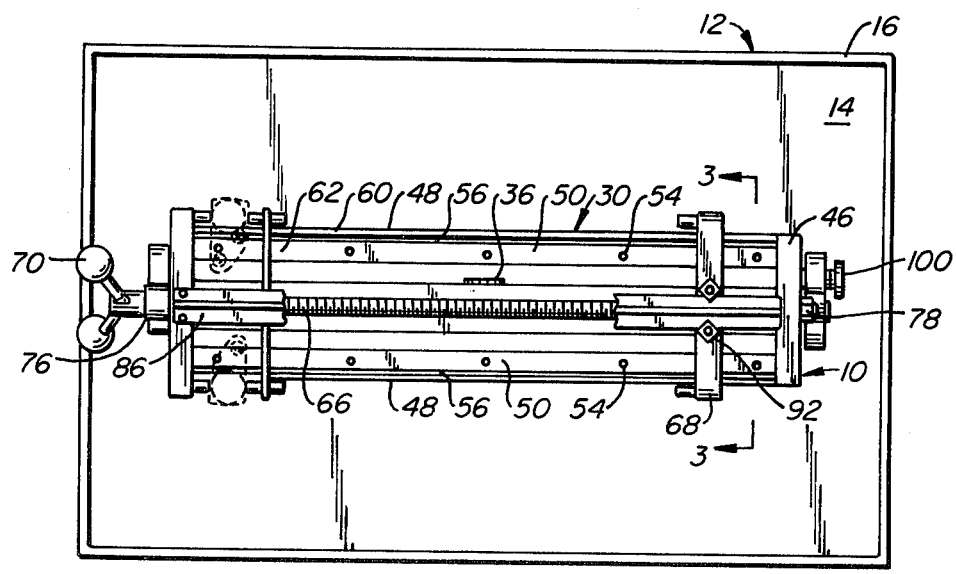
FIG._2.
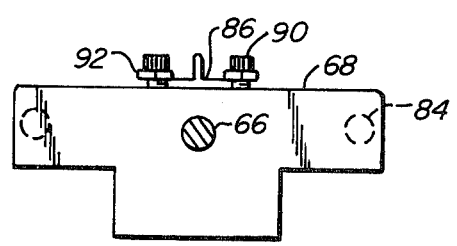
FIG._3.

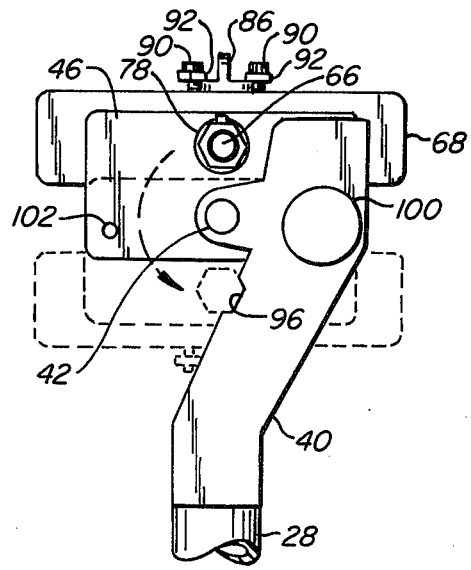
FIG._4.
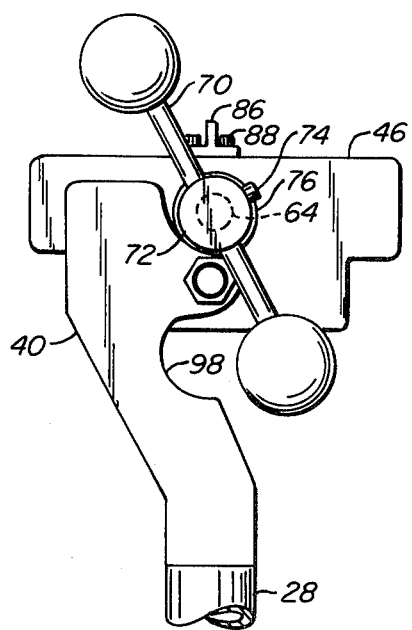
FIG._5.
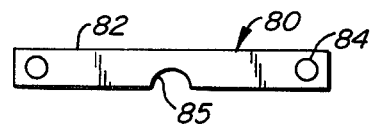
FIG._6.

SERVICE RACK FOR FUEL INJECTORS

BACKGROUND OF THE INVENTION

This invention relates to a service rack for fuel injectors, particularly for truck and buses owned by fleet operators which continuously service large numbers of fuel injectors. Because the fuel injectors are a critical component to the efficient operation of a diesel engine, they must be periodically inspected, cleaned, and if necessary, maintained by the replacement of worn or defective parts. In order to properly inspect a fuel injector, it must be removed from the engine and disassembled. Each injector is customarily disassembled, inspected and serviced sequentially, the same steps being repetitiously performed. Where many injectors are continuously being serviced, the series of steps is not only monotonous, but time consuming. The sequential servicing of injectors prevents a thorough comparative evaluation of a set of injectors of an engine to determine which injectors should be replaced in whole or in part in order to maintain a general uniformity in performance.

While the described injectors do not form an integral part of the service rack, they aid in describing the rack as the construction of the injectors in part determines the cooperative construction and arrangement of the various components of the service rack.

The service rack provides a convenient clamp mount for a plurality of injectors each uniformly positioned and spacially arranged on the service rack for easy access by the service tools. Furthermore, the clamp mount is arranged for rotation to service a front or back row of injectors; and inversion to service the top or bottom of the mounted injectors.

These and other features, designed to substantially improve the ease and speed of fuel injector servicing, are described in greater detail in the detailed description of the preferred embodiment.

SUMMARY OF THE INVENTION

The service rack for fuel injectors of this invention comprises a mounting device for a plurality of fuel injectors. While the preferred embodiment is designed for large injectors conventionally utilized in diesel buses, other similar injectors can be utilized in the service rack with minor modification in the mounting and spacer sizes and arrangement.

The service rack of this invention is constructed and arranged to mount a varying plurality of common fuel injectors to allow the sequence of service and inspection steps to be performed on all injectors in one sequence.

This eliminates a repetitious change of service tools for each injector and allows a comparative examination of all injectors in a batch at each stage of the service and inspection routine. This device is particularly helpful for fleet operators, such as bus lines, who have a continuous maintenance operation.

The injector service rack has a support assembly for mounting a plurality of injectors in a uniform double row in opposed pairs. Where odd numbers of injectors are to be serviced, a blank or spacer can be inserted opposite the odd injector. The support assembly has a positioning means for uniformly positioning the injectors, and a spacer network for separating adjacent spacers the necessary distance apart for convenient tool access.

Operating in conjunction with the support assembly is a clamping mechanism for clamping the positioned and spaced injectors in bank. The support assembly and clamping mechanism are pivotally mounted into a pivot support bracket which permits inversion of the support assembly for convenient servicing of the underside of the bank of injectors. Pivot of the support assembly about a horizontal pivot axis is limited by stops having an associated locking mechanism to retain the assembly in either the upright or inverted position.

For further convenience of servicing the support bracket rotatably mounted on a vertical column for rotating the support bracket and support assembly about a vertical axis. The rotation feature brings either row of injectors to the fore for access. The vertical column is centrally located on a service table having a flat top surface with a raised rim to collect spilled diesel fuel or dropped parts during the servicing operation.

The service rack may alternately be mounted to a fixed service bench instead of a relatively movable service cart.

BRIEF DESCRIPTION OF THE DRAWINGS

FIG. 1 is a front elevational view, partially segmented, of the service rack.

FIG. 2 is a plan view of the service rack of FIG. 1.

FIG. 3 is a partial cross sectional view taken on the lines 3—3 showing the vice plate.

FIG. 4 is a first partial end elevational view of the service rack.

FIG. 5 is an opposite partial end elevational view of the service rack.

FIG. 6 is a front elevational view of an exemplar spacer.

DESCRIPTION OF THE PREFERRED EMBODIMENTS

Referring to FIG. 1, the service rack 10 is shown in its preferred embodiment, integrally mounted to a moveable service cart 12. The cart 12, includes a flat table top 14 with a raised rim 16 supported by four legs 18.

The service rack 10 is coupled to the cart 12 by a journal column 24 centrally located and secured to the table top by bolts 26. The journal column engages a socket sleeve 28, which is welded to an elongated support bracket 30 which pivotally holds at each end, the fuel injector support assembly 32 and clamping mechanism 34. The support bracket 30 and supported components can be locked in any swivel position about a vertical axis by manual tightening of a knob screw 36 which is threaded to the socket sleeve 28 and engages the journal column 24 in the manner of a set screw.

The elongated support bracket 30 has a horizontal cross member 38 with two raised end arms 40. The end arms 40 each have a journal pin 42, which engages the injector support assembly 32. The pivotal connection of the support assembly 32 to the support bracket 30 allows the support assembly to pivot about a horizontal axis.

The support assembly 30 comprises rack bed 44 shown also in FIG. 2 coupled at each end to rigid end plates 46. The rack bed 44 is formed of a pair of elongated L-channels 48. The channels 48 are spaced parallel to one another and are welded at their ends to the end plates 46.

Coupled to the L-channels are a pair of rectangular bars 50. The bars are adjustably secured to the L-channels 48 by bolts 52 threaded through slots (not visible) in the L-channels and threaded holes 54 in the bars. The bars are arranged on the channels to form a narrow slot 56 between the edge of the bar and one side face of the L-channel. This slot 56 provides a convenient means to uniformly position fuel injectors having a locating pin normally used for mounting and positioning the injector in an engine seating. When mounted to the rack bed 44 of the support assembly 32, the locating pins of the injectors engage the slot with the underside edge of the injector body seating on the top edge 60 of the L-channel and top surface 62 of the bars 50.

Referring to FIGS. 3, 4 and 5, the spaced end plates 46 of the support assembly 32 each have a shaft hole 64 located above the journal pins 42 pivotally connecting the support assembly to the support bracket. The axially aligned shaft holes support an elongated hand screw 66. The hand screw 66 threadably engages a transportable vice plate 68 which co-acts with one of the end plates 46 to form a vice for clamping a plurality of injectors. Transport of the vice plate 68 is accomplished by rotation of a knob wheel 70 fixed to one end of the hand screw 66. The hub 72 of the knob wheel 70 is retained to the hand screw 66 by a set screw 74 and interfaces a bushing 76 for facilitating a firm clamping action. The opposite end of the hand screw 66 is retained by a nut, washer and pin assembly 78.

The injectors are hand positioned on the rack bed 44 and spaced apart by spacers 80, an exemplar shown in FIG. 6. The spacers 80 comprise a center plate 82 with two bearing contacts 84 at each end which project on each side of the center plate to contact a machined face of the injectors as schematically shown in phantom in FIGS. 1 and 2. The arrangement of FIG. 1 is set for placement of a full compliment of 16 injectors (one shown in phantom). However, the number of injectors can be fewer in number by movement of the vice plate and removal of an appropriate number of spacers 80. The spacers 80 are supported and balanced on the hand screw 66 by means of a complimentary half circle slot 85 in the lower center of the center plate, while the injector rack shown is designed to carry a maximum of 16 injectors, the number is arbitrary and the unit can be designed in an expanded or contracted structure to hold a greater or lesser number of injectors, depending on the expected use in typical service environments.

To insure that the injectors do not work free of the spacer contacts during service operations, a top retainer bar 86 is installed after the injectors have been positioned and clamped into place. The retainer bar 86, shown in FIG. 5, is screwed at one end to an end plate 46 of the support assembly 32 by machine screws 88. The retainer bar 86, as shown in FIG. 3, is clamped to the transportable vice plate 68 by two machine screws 90 and cooperating dogs 92 which contact the edge of the retainer bar 86 to secure the bar to the vice plate and thereby retain a plurality of injectors clamped into service position.

As shown in FIGS. 4 and 5, the configuration of the end arms 40 of the support bracket 30 is such to permit the pivotal inversion of the support assembly. The angular notch 96 and circular notch 98 allow the nut assembly 78 at the end of the hand screw 66, and bushing 76 to function as stops, limiting pivot of the support assembly 32 to a 180° inversion. A knob screw 100 engages one of two threaded holes 102 in the adjacent end plate 46 to lock the support assembly 32 in either its upright or inverted position.

In operation, a serviceman simply removes the retainer bar and loads the service rack with a batch of injectors, placing a spacer between each injector. The vice plate is then moved to clamping position and the retainer bar secured. The knob for the column rotation is secured as is the inversion lock. In this condition the tops of the front bank of injectors can be serviced. The column knob is retracted to pivot the back bank of injectors to a service position. Subsequently the support rack assembly can be inverted to position the bottoms of the injectors. While such steps are variable, the service rack conveniently supports a plurality of injectors in a variety of positions in a fixed or clamped orientation accessible to the necessary service tools.

While on the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A service rack for inspection and service of a plurality of vehicle fuel injectors comprising:
   a. a rigid support structure;
   b. a support bracket connected to the support structure, wherein said support bracket is connected to said rigid support structure by swivel means for swivel of said support bracket about a vertical axis;
   c. a support rack assembly having a horizontal rack bed for support of a plurality of fuel injectors;
   d. pivotal connection means connecting said support rack assembly to said support bracket for pivot about a horizontal axis, wherein said support bracket has an elongated horizontal member with two end arms and said rack bed has end members, said pivotal connection means comprising journal pins between said end arms and said end members;
   e. a clamping mechanism operably connected to said support rack having a transport means for clamping a plurality of fuel injectors supported in said rack bed for servicing, wherein said clamping mechanism comprises a transport screw rotatably connected to each of said end members of said support rack assembly, said transport screw having means for rotating said screw, and a transportable vice member threadably connected to said transport screw and moveable between said end members;

wherein said rack bed has two parallel, elongated seating members arranged on each side of the centrally located transport screw, between said end members of said rack bed, said seating members fixed to said end members, said seating members being constructed with means for supporting and positioning a plurality of injectors in pairs on each side of said transport screw in a uniform manner between one of said end members and said transportable vice member, whereon on clamping by said vice member the plurality of injectors are retained in a uniform position.

2. The service rack of claim 1 wherein said clamping mechanism includes contact elements on said vice member for contacting and clamping a plurality of injectors between said vice member and one of said end members.

3. The service rack of claim 1 wherein said support rack assembly includes a retainer bar mountable on said vice member and said one end member.

4. The service rack of claim 1 including at least one spacer insertable between adjacent injectors.

5. The service rack of claim 1 wherein said pivotal connection means connecting said support rack assembly to said support bracket includes stop means and selective lock means for limiting pivot of said rack assembly to an upright and inverted position, and selectively locking said rack assembly in one of said positions.

6. The service rack of claim 1 wherein said support bracket is connected to said rigid support structure by swivel means for swivel of said support bracket about a vertical axis, said swivel means having a locking device for locking said support bracket in any selected swivel position.

7. The service rack of claim 1 wherein said elongated seating members each comprise an L-channel fixed to the end members, and a rectangular bar attached to the L-channel, wherein said L-channel has a side face and said bar has an edge, said bar being attached to said L-channel to form a slot between said bar edge and said L-channel side face, wherein said slot provides a positioning means for a positioning pin on the injectors to uniformly orient the injectors on said rack bed.

* * * * *